United States Patent
Wu et al.

(10) Patent No.: US 7,292,295 B2
(45) Date of Patent: Nov. 6, 2007

(54) MICRO-REFLECTIVE LIQUID CRYSTAL DISPLAY

(75) Inventors: Yi-Chun Wu, Hualien (TW); Yi-Fan Chen, Tainan (TW)

(73) Assignee: Wintek Corporation, Taichung (TW)

( * ) Notice: Subject to any disclaimer, the term of this patent is extended or adjusted under 35 U.S.C. 154(b) by 301 days.

(21) Appl. No.: 11/025,953

(22) Filed: Jan. 3, 2005

(65) Prior Publication Data

US 2006/0146236 A1 Jul. 6, 2006

(51) Int. Cl.
*G02F 1/1335* (2006.01)

(52) U.S. Cl. ...................... 349/113; 349/114

(58) Field of Classification Search ............. 349/113, 349/114
See application file for complete search history.

(56) References Cited

U.S. PATENT DOCUMENTS 6,124,907 A * 9/2000 Jones et al. .................. 349/96
6,927,820 B2 * 8/2005 Jang et al. ................... 349/114
7,212,267 B2 * 5/2007 Fujimori et al. ............. 349/114

* cited by examiner

*Primary Examiner*—David Nelms
*Assistant Examiner*—David Y. Chung
(74) *Attorney, Agent, or Firm*—Bacon & Thomas, PLLC

(57) ABSTRACT

A micro-reflective liquid crystal display including an upper polarizing plate, an upper substrate having transparent electrode, a color light-filtering plate, a liquid crystal layer, an inner polarizing film, a lower substrate having transparent electrode, driving cell and storage capacitor, a lower polarizing plate and a backlight source. The inner polarizing film is deposited on one face of the lower substrate adjacent to the liquid crystal layer. The color light-filtering plate is formed with an opening corresponding to the storage capacitor, whereby external light can go in through the opening. The upper metal layer of the storage capacitor forms a reflective region for reflecting the external light to serve as a light source for the liquid crystal display. Accordingly, when exposed to outdoor sunlight, the micro-reflective liquid crystal display can still present a clear image.

3 Claims, 4 Drawing Sheets

MICRO-REFLECTIVE LIQUID CRYSTAL DISPLAY

BACKGROUND OF THE INVENTION

The present invention is related to a micro-reflective liquid crystal display in which the color light-filtering plate is formed with an opening, whereby external light can go in through the opening. An upper metal layer of the storage capacitor serves to reflect the external light to serve as a light source for the liquid crystal display.

FIG. 4 shows a conventional Transmissive type Thin Film transistor (TFT) liquid crystal display. A liquid crystal layer 83 is disposed between the upper and lower substrates 81, 82. An upper polarizing plate 84 and a lower polarizing plate 85 are disposed respectively corresponding to the upper and lower substrates 81, 82. A backlight source (not shown) is disposed under the lower polarizing plate 85. A film transistor matrix electrode 86 and a storage capacitor 87 are disposed on the lower substrate 82 corresponding to each pixel. The storage capacitor 87 is composed of a lower metal layer 871, an insulating layer 872 and an upper metal layer 873 which are piled. A black matrix 88 is disposed under the upper substrate 81 corresponding to the thin film transistor matrix electrode 86 and a storage capacitor 87 to shade the same so as to avoid reduction of contrast of the displayed image.

The above TFT liquid crystal display lacks reflective structure for reflecting external light. Only the backlight source serves as the light source of the image. Therefore, when exposed to outdoor sunlight, the contrast of the image of the TFT liquid crystal display will be reduced so that the displayed image can be hardly clearly seen.

In order to obviate the above problem, some manufacturers arrange reflective board structure on the lower substrate corresponding to each pixel. The reflective board structure is composed of reflective electrode region and transparent electrode region. For example, such structure is disposed in Taiwanese Patent Publication No. 482917, entitled "liquid crystal display device" (U.S. Pat. No. 6,295,109). However, such structure will sacrifice the opening ratio of the transparent mode. Moreover, the manufacturing procedure is complicated and it is hard to design the optical structure.

In the existent micro-reflective liquid crystal display device, a dual brightness enhancement film (DBEF) with scattering particles is externally attached to the display for solving the problem of reduction of contrast. However, in reflective mode, the DBEF tends to result in parallax problem of the displayed image. In addition, the cost for the DBEF is quite high so that it is not economic to use the DBEF.

SUMMARY OF THE INVENTION

It is therefore a primary object of the present invention to provide amicro-reflective liquid crystal display in which the inner polarizing film is deposited on one face of the lower substrate adjacent to the liquid crystal layer. The color light-filtering plate is formed with an opening corresponding to the storage capacitor, whereby external light can go in through the opening. The upper metal layer of the storage capacitor forms a reflective region for reflecting the external light to serve as a light source for the liquid crystal display. Accordingly, when exposed to outdoor sunlight, the micro-reflective liquid crystal display can still present a clear image.

According to the above object, the micro-reflective liquid crystal display of the present invention includes an upper polarizing plate, an upper substrate having transparent electrode, a color light-filtering plate, a liquid crystal layer, an inner polarizing film, a lower substrate having transparent electrode, driving cell and storage capacitor, a lower polarizing plate and a backlight source. The storage capacitor is composed of a lower metal layer, an insulating layer and an upper metal layer which are piled. The inner polarizing film is deposited on one face of the lower substrate adjacent to the liquid crystal layer. The color light-filtering plate is formed with an opening corresponding to the storage capacitor, whereby external light can go in through the opening. The upper metal layer of the storage capacitor forms a reflective region for reflecting the external light to serve as a light source for the liquid crystal display.

The present invention can be best understood through the following description and accompanying drawings wherein:

BRIEF DESCRIPTION OF THE DRAWINGS

FIG. 3 is a sectional view showing the working state of the present invention when the voltage is turned on.

DETAILED DESCRIPTION OF THE PREFERRED EMBODIMENTS

Figure 1:
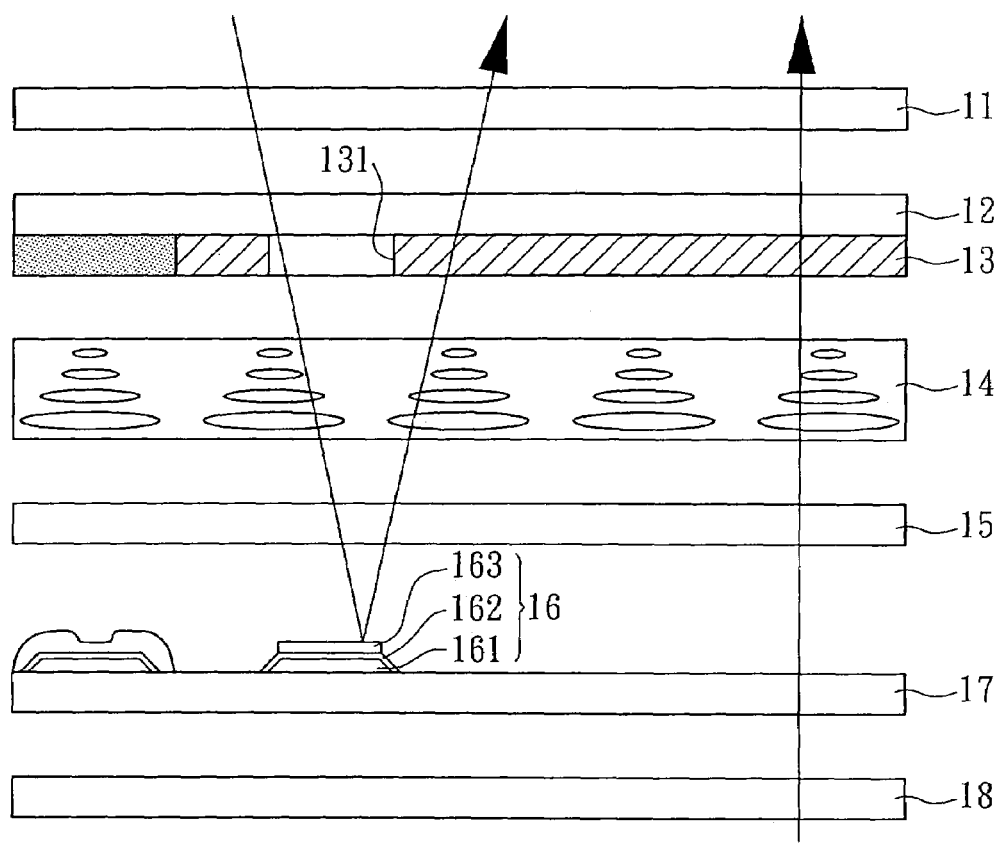
FIG. 1 is a sectional view showing the structure of the present invention.
Figure 2:
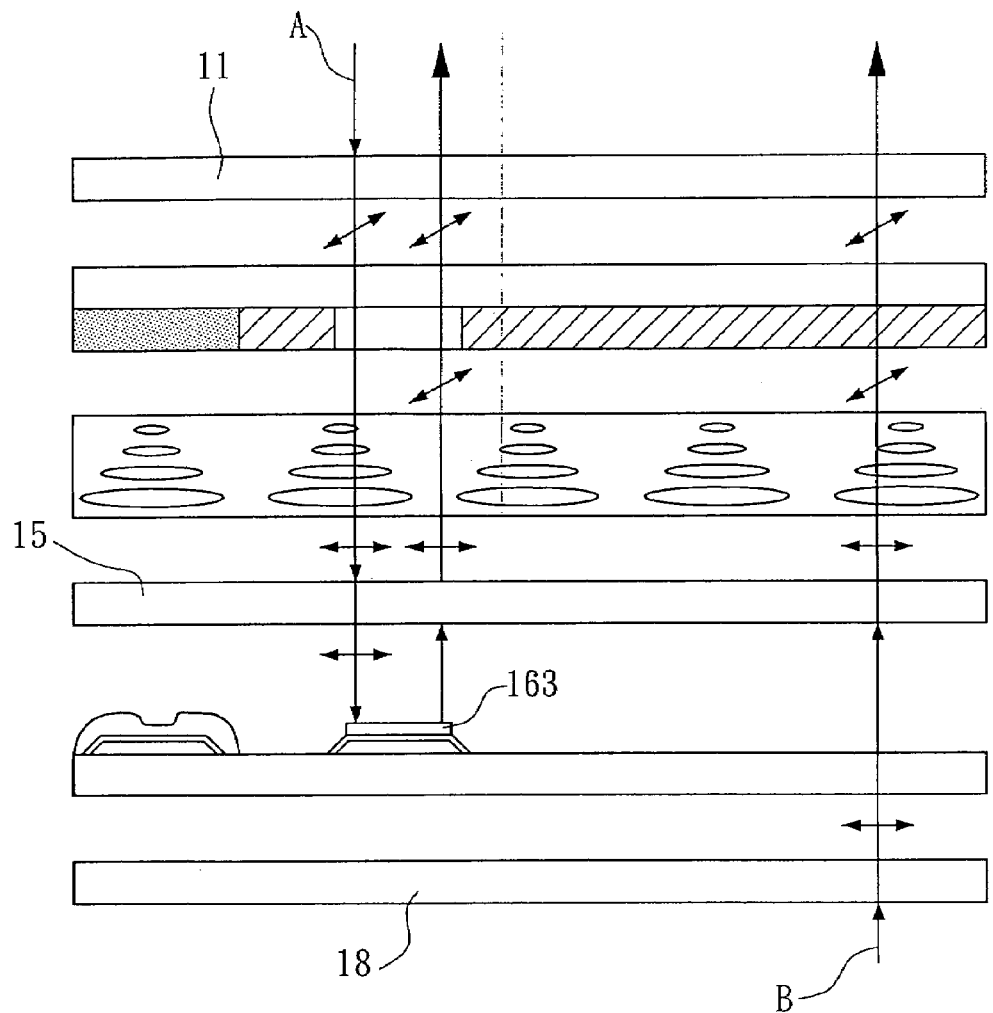
FIG. 2 is a sectional view showing the working state of the present invention when the voltage is cut off.
Figure 3:
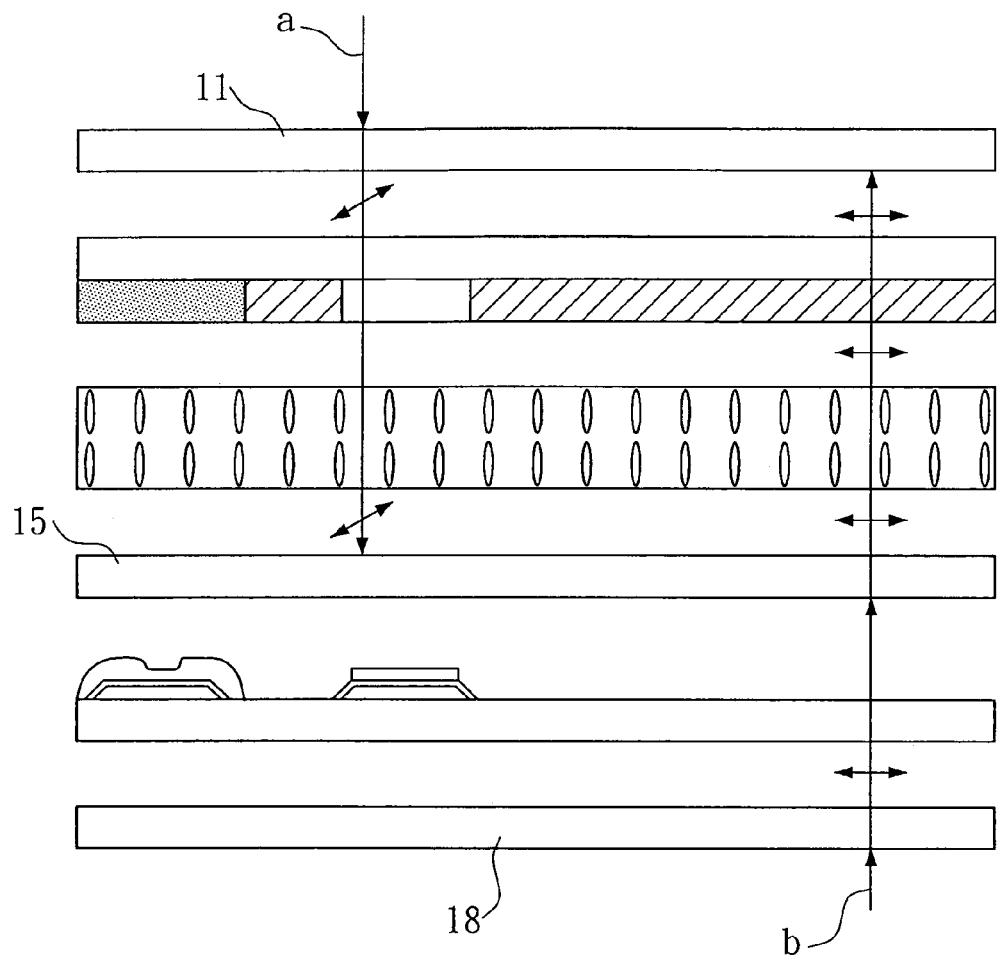
Figure 4:
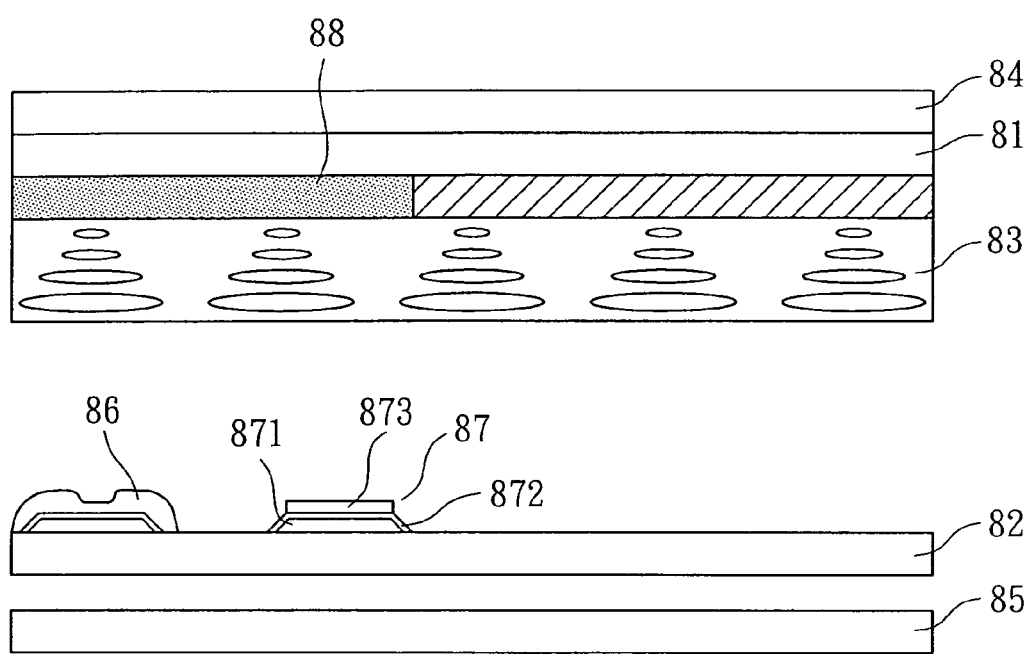
FIG. 4 is a sectional view showing the structure of a conventional transparent film transistor liquid crystal display.

Please refer to FIGS. 1 to 3. The micro-reflective liquid crystal display of the present invention includes an upper polarizing plate 11, an upper substrate 12 having transparent electrode, a color light-filtering plate 13 associated with the upper substrate 12, a liquid crystal layer 14, an inner polarizing film 15, a lower substrate 17 having transparent electrode, driving cell (that is, TFT) and storage capacitor 16, a lower polarizing plate 18 and a backlight source (not shown). The storage capacitor 16 is composed of a lower metal layer 161, an insulating layer 162 and an upper metal layer 163 which are piled.

The inner polarizing film 15 is deposited on one face of the lower substrate 17 adjacent to the liquid crystal layer 14. The light penetration axis of the inner polarizing film 15 is parallel to the light penetration axis of the lower polarizing plate 18. The material of the storage capacitor 16 contains over 90% silver or aluminum. The thickness of the storage capacitor 16 is within 50 nm~200 nm. The color light-filtering plate 13 is formed with an opening 131 corresponding to the storage capacitor 16. The opening 131 is 5%~95% the surface area of the upper metal layer 163 of the storage capacitor 16. The external light can go in through the opening 131. The surface of the upper metal layer 163 of the storage capacitor 16 serves as a reflective region, whereby the external light going in through the opening 131 can be reflected as a light source for the liquid crystal display.

In contrast to the traditional TFT liquid crystal display in which black matrix is disposed on the upper substrate corresponding to the thin film transistor matrix electrode and storage capacitor to shade the same, in the present invention, the black matrix above the storage capacitor is removed. Instead, the color light-filtering plate 13 is formed with an opening 131 corresponding to the storage capacitor 16. By means of the ratio of the opening, the reflectivity of the reflective region formed by the upper metal layer 163 of the storage capacitor 16 can be controlled. It is proved through tests that in condition that the surface area of the storage capacitor 16 is about 1/10~1/7 the subpixel and the opening 131 of the color light-filtering plate 13 is about 1/3 the surface area of the storage capacitor 16, the reflectivity of light can reach about 2%. Apparently, the structure of the present invention can achieve micro-reflective function.

A TN-type liquid crystal is exemplified for describing the actual working state of the present invention as follows:

Referring to FIG. 2, when the voltage is cut off, the TN-type liquid crystal is 90 degrees revolved. The external light A is polarized by the upper S-polarizing plate 11 into S-polarized light. Then the light is revolved by the 90-degree TN-type liquid crystal to form P-polarized light. The light penetration axis of the inner polarizing film 15 is parallel to the light penetration axis of the lower polarizing plate 18 and both are in P-polarized state. Therefore, the light is revolved by the TN-type liquid crystal to form P-polarized light which can pass through the inner polarizing film 15 to be reflected by the reflective region of the upper metal layer 163 and then outgo from the inner polarizing film 15. The light is kept in P-polarized state. The light B of the backlight source is polarized by the lower polarizing plate 18 to form P-polarized light. Both the reflected external light and the light, of the backlight source are P-polarized. The light is further revolved by the 90-degree TN-type liquid crystal to form S-polarized light. Finally, the light outgoes from the upper polarizing plate 11. That is, when the voltage is cut off, no matter whether the display is in the reflective mode of outdoor sunlight or in the transparent mode of the backlight source, clear image can be presented.

Referring to FIG. 3, when the voltage is turned on, the direction of the TN-type liquid crystal is parallel to the direction of the electric field. The external light a is polarized by the upper S-polarizing plate 11 into S-polarized light. Then the light goes through the TN-type liquid crystal parallel to the electric field direction and keeps S-polarized. The light penetration axis of the inner polarizing film 15 is in P-polarized and normal to the S-polarized light. Therefore, the S-polarized light cannot pass through the inner polarizing film 15. The light b of the backlight source is polarized by the lower polarizing plate 18 to form P-polarized light. After the light goes through the TN-type liquid crystal parallel to the electric field direction and the inner polarizing film 15, the light keeps P-polarized and cannot pass through the upper S-polarizing plate 11. That is, when the voltage is turned on, no matter whether the display is, in the reflective mode of outdoor sunlight or in the transparent mode of the backlight source, no bright image can be achieved.

In conclusion, in the present invention, the inner polarizing film 15 is deposited on one face of the lower substrate 17 adjacent to the liquid-crystal layer 14, whereby a reflective region 19 is formed on the surface of the storage capacitor 1.6. In addition, the color light-filtering plate 13 is formed with an opening 131 corresponding to the storage capacitor 16. After the external light goes in through the opening 131 of the color light-filtering plate 13, the external light is reflected by the reflective region formed by the upper metal layer 163 of the storage capacitor 16 to serve as a light source for the liquid crystal display. Accordingly, when exposed to outdoor sunlight, a clear image can be still presented.

In another embodiment, the color light-filtering plate can be disposed on the lower substrate to achieve the same effect as the above embodiment.

The above embodiments are only used to illustrate the present invention, not intended to limit the scope thereof. Many modifications of the above embodiments can be made without departing from the spirit of the present invention.

What is claimed is:

1. A micro-reflective liquid crystal display comprising an upper polarizing plate, an upper substrate having transparent electrode, a color light-filtering plate, a liquid crystal layer, an inner polarizing film, a lower substrate having transparent electrode, driving cell and a storage capacitor, a lower polarizing plate and a backlight source, the storage capacitor being composed of a lower metal layer, an insulating layer and an upper metal layer which are piled, said micro-reflective liquid crystal display being characterized in that the inner polarizing film is deposited on one face of the lower substrate adjacent to the liquid crystal layer, the color light-filtering plate being formed with an opening corresponding to the storage capacitor, whereby external light can go in through the opening, the upper metal layer of the storage capacitor forming a reflective region for reflecting the external light to serve as a light source for the liquid crystal display, wherein the opening of the color light-filtering plate is 5%-95% of the surface area of the upper metal layer of the storage capacitor.

2. The micro-reflective liquid crystal display as claimed in claim 1, wherein the light penetration axis of the lower polarizing plate is parallel to the light penetration axis of the inner polarizing film.

3. A micro-reflective liquid crystal display comprising an upper polarizing plate, an upper substrate having transparent electrode, a color light-filtering plate, a liquid crystal layer, an inner polarizing film, a lower substrate having transparent electrode, driving cell and a storage capacitor, a lower polarizing plate and a backlight source, the material of the storage capacitor contains over 90% silver or aluminum, the thickness of the storage capacitor being within 50 nm~200 nm, the storage capacitor being composed of a lower metal layer, an insulating layer and an upper metal layer which are piled, said micro-reflective liquid crystal display being characterized in that the inner polarizing film is deposited on one face of the lower substrate adjacent to the liquid crystal layer, the color light-filtering plate being formed with an opening corresponding to the storage capacitor, whereby external light can go in through the opening, the upper metal layer of the storage capacitor forming a reflective region for reflecting the external light to serve as a light source for the liquid crystal display.

* * * * *